United States Patent [19]
Plant

[11] 3,937,014
[45] Feb. 10, 1976

[54] ELECTRIC CONTROL CIRCUIT ARRANGEMENTS FOR GAS TURBINE ENGINES

[75] Inventor: Anthony Brian Plant, Birmingham, England

[73] Assignee: Joseph Lucas Industries Limited, Birmingham, England

[22] Filed: Oct. 30, 1974

[21] Appl. No.: 519,272

[30] Foreign Application Priority Data
Nov. 7, 1973 United Kingdom............... 51604/73

[52] U.S. Cl................ 60/243; 60/39.28 R; 415/10; 415/17; 60/241
[51] Int. Cl.²........................................... F02K 3/08
[58] Field of Search..... 60/39.28 R, 39.28 T, 39.27, 60/240, 241, 243; 415/10, 15, 17

[56] References Cited
UNITED STATES PATENTS

| | | | |
|---|---|---|---|
| 3,255,586 | 6/1966 | Hennig | 60/39.27 X |
| 3,834,361 | 9/1974 | Keely | 60/39.28 R |
| R24,809 | 4/1960 | Offner | 60/39.28 R |

*Primary Examiner*—Clarence R. Gordon
*Attorney, Agent, or Firm*—Holman & Stern

[57] ABSTRACT

A control circuit arrangement for a gas turbine engine has first and second identical control circuits which are responsive to groups of input signals to provide nominally identical first and second output signals. It is arranged that input signals to the first control circuit are nominally identical with corresponding input signals to the second control circuit. Means are provided, responsive to malfunction of either one of the first and second control circuits, to render the malfunctioning circuit inoperative and to render the other of the control circuits operative. A third control circuit is responsive to at least one pair of corresponding input signals to the first and second circuits, to provide a third output signal to the engine. The first, second and third output signals do not control the engine reheat system, and the arrangement may include a fourth control circuit for controlling this reheat system.

6 Claims, 3 Drawing Figures

ELECTRIC CONTROL CIRCUIT ARRANGEMENTS FOR GAS TURBINE ENGINES

This invention relates to electric control circuit arrangements for gas turbine engines.

It is known, in order to increase operational reliability, to duplicate electric control circuits which generate output control signals for aircraft gas turbine engines. It has in the past been the practice to duplicate such circuits in their entirety. Such circuits, however, commonly include elements whose inherent reliability is high, or whose failure will not have an unacceptable effect, or whose failure can readily be compensated for, or which are responsive to a common input signal from a single source, or whose outputs are interconnected to provide a common output signal. Duplication of such elements results in unnecessary loss of space and increase in weight, and may complicate servicing.

It is an object of the invention to provide a control circuit arrangement in which unnecessary duplication of elements is avoided.

According to the invention an electric control circuit arrangement for a gas turbine engine comprises a first control circuit responsive to a plurality of first input signals to provide first output control signals, a second control circuit responsive to a plurality of second input signals to provide second output control signals which are nominally identical with said first control signals, corresponding ones of said first and second input signals being nominally identical and first and second output control signals being nominally identical, a third control circuit responsive to at least one of said input signals to provide a third output control signal, and selector means for rendering either said first or said second control circuit operative, said selector means being responsive to malfunction of either one of said first and second control circuits to render the malfunctioning one of said circuits inoperative and to render the other of said circuit operative.

Examples of the invention will now be described with reference to the accompanying drawings, in which.

Figure 1:
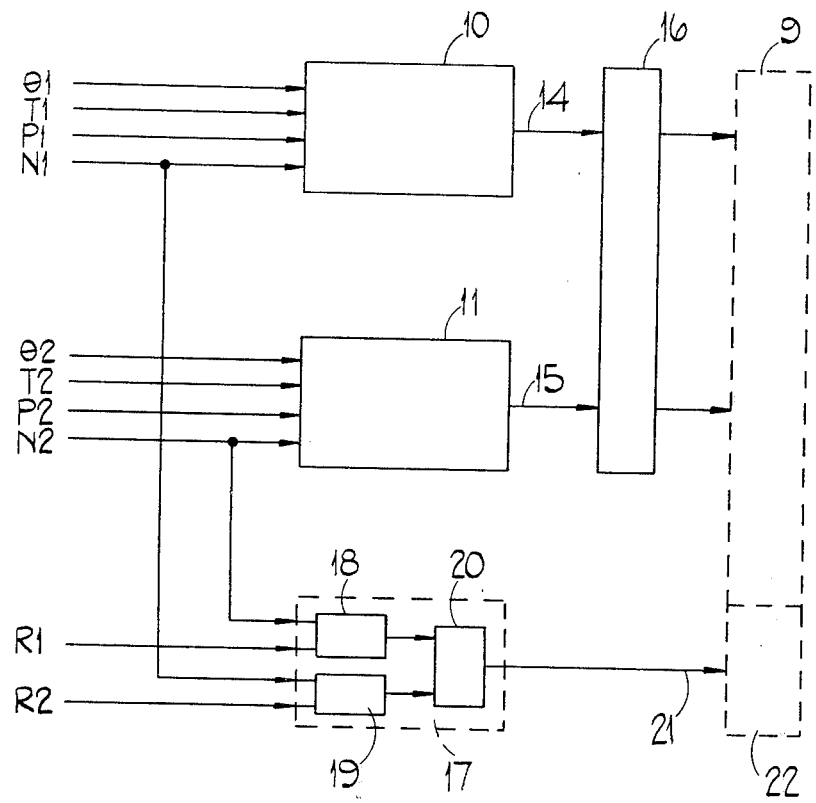
FIG. 1 shows a block diagram of a gas turbine engine fuel control arrangement.

As shown in FIG. 1 a control system for an aircraft gas turbine engine 9 comprises two identical control circuits 10, 11.

Control circuit 10 is responsive to input signals derived from transducers and dependent on engine operating parameters, as for example a signal $\theta$, corresponding to the position of an engine speed selection lever, a signal $T_1$ corresponding to a temperature at a slected location in the engine, a signal $P_1$ corresponding to an air pressure at a selected location in the engine compressor, and a signal $N_1$ corresponding to engine speed.

Control circuit 11 is responsive to a further set of control signals $\theta_2$, $T_2$, $P_2$, $N_2$ which correspond to the above parameters, but which are derived from a different set of transducers, so that corresponding input signals to control circuits 10, 11 are nominally identical. Circuits 10, 11 generate nominally identical output control signals on respective lines 14, 15 which can pass via a selector logic circuit 16 to the engine 9 to control fuel flow, in a known manner.

Logic circuit 16 is operative to pass the signals from only one of circuit arrangements 10, 11 and is arranged so as normally to pass signals from arrangement 10. Circuit 16, is, moreover, responsive to the operating condition of arrangement 10 so that, in the event of malfunction of the latter, signals from arrangement 11 are then passed to the engine.

There is also provided a further logic and switching circuit 17 the output signal from which does not provide a control signal for the engine. In the example shown circuit 17 includes two switch devices 18, 19 respectively responsive to the speed input signals $N_1$, $N_2$ and also to respective reference signals $R_1$, $R_2$ to provide output signals when the engine speed falls below a predetermined level. A comparator device 20 is responsive to the signals from switch devices 18, 19 so as to provide an output signal on a line 21 only if there is no significant disparity between the outputs of devices 18, 19. The signal on line 21 is arranged to energise an indicator or warning device 22.

Figure 2:
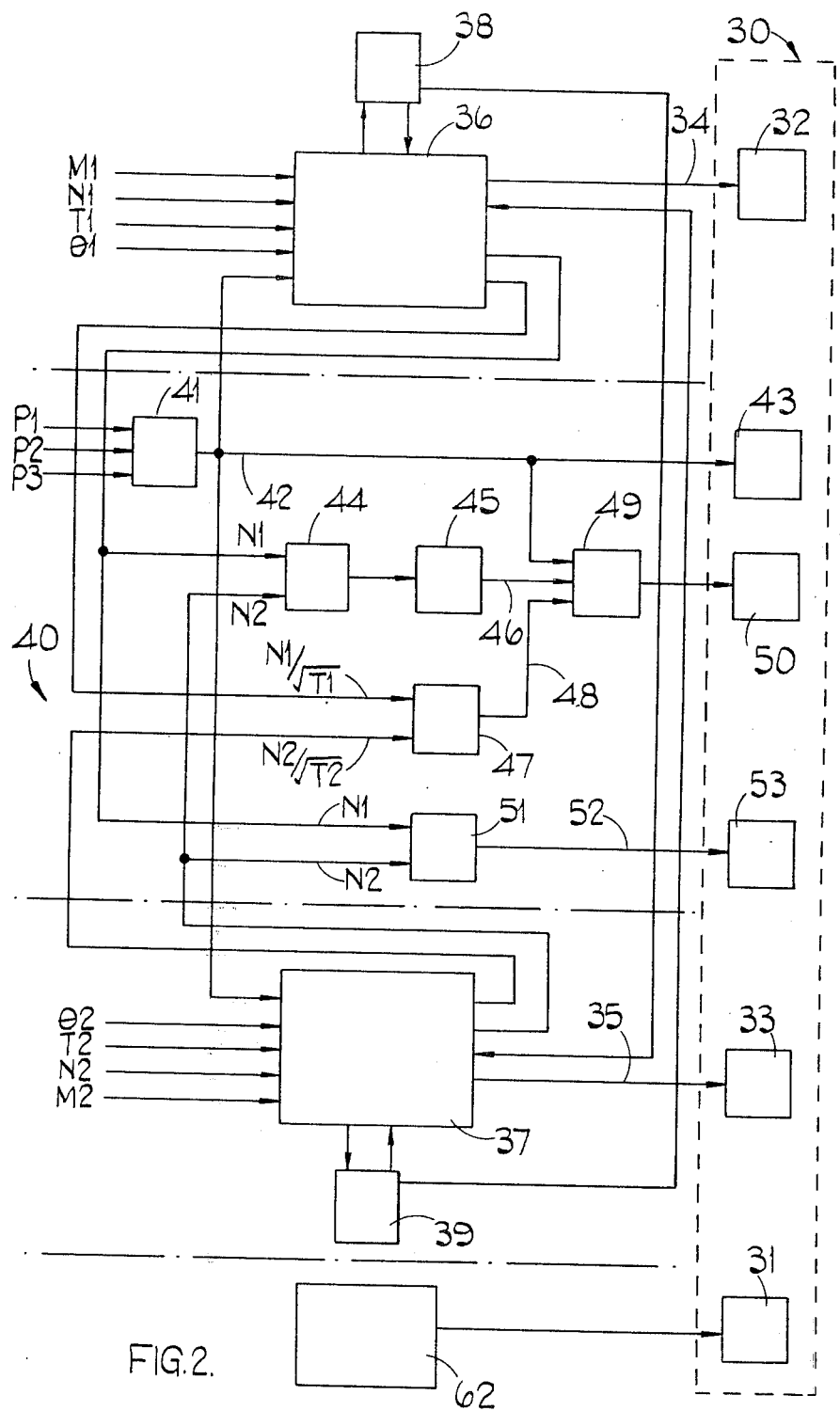
FIG. 2 shows an alternative arrangement.

As shown in FIG. 2 a gas turbine engine, indicated generally at 30, includes a reheat system 31. The engine 30 includes a fuel metering valve which is operable by either one of a pair of actuators 32, 33 which are respectively responsive to first and second electrical control signals on lines 34, 35.

A first control circuit 36 is responsive to a first set of input signals derived from transducers, and dependent on engine operating parameters, to generate the first control signals on line 34. The first control signals include, for example, a signal $\theta_1$ corresponding to the position of an engine speed selection lever, a signal $T_1$, corresponding to the temperature at a selected location in the engine 30, a signal $N_1$ corresponding to engine speed, and a signal $M_1$ corresponding to the air speed of an aircraft in which the engine 30 is fitted.

A second control circuit 37 is identical with circuit 36 and is responsive to a second set of control signals, $\theta_2$, $T_2$, $N_2$, $M_2$ which correspond to the above parameters but which are derived from different transducers, so that corresponding input signals in the first and second sets of control signals are nominally identical. The second control circuit 37 provides the second electrical control signal on line 35.

The control arrangement as a whole will initially be working with a selected one of control circuits 36, 37 operative. Respectively associated with the control circuits 36, 37 are first and second monitor circuits 38, 39. Monitor circuit 38 is responsive to malfunction of circuit 36, or to departure of any one of input signals $M_1$, $N_1$, $T_1$, $\theta_1$ from acceptable limits, to render circuit 36 inoperative and circuit 37 operative. Monitor circuit 39 is similarly responsive to malfunction of circuit 37 to render circuit 17 inoperative and circuit 36 operative.

A third electrical control circuit 40 includes a circuit element 41 which is responsive to input signals $P_1$, $P_2$, $P_3$ from three identical transducers, the signals $P_1$, $P_2$, $P_3$ corresponding to the pressure at a selected location within a compressor of the engine 30. The circuit element 41 is of a known type which compares the signals $P_1$, $P_2$, $P_3$ with one another, rejecting any signal which differs from the other two by more than a predetermined amount. The circuit element 41 also provides an output signal on a line 42, this output signal being an average of those of the signals $P_1$, $P_2$, $P_3$ which have not been rejected. The signal on line 22 thus has a high integrity and provides one of the input signals to both the first and second control circuits 36, 37. A blow off valve 43, by means of which a high pressure zone of the engine compressor may be vented, is also incorporated in the engine 30. Valve 43 is responsive to an increase in the signal on line 42 above a predetermined limit.

A selector switch 44 is responsive to whichever of control circuits 36, 37 is in operation, to supply either the signal $N_1$, via circuit 36, or the signal $N_2$, via circuit 37, to a differentiating circuit 45. Circuit 45 provides, on a line 46, an acceleration signal based on the output signal from selector 44.

A further selector switch 47 is responsive to whichever of circuits 36, 37 is in operation, to supply either a signal proportional to $N_1\sqrt{T_1}$ from circuit 36, or a signal proportional to $N_2\sqrt{T_2}$ from circuit 37, to a line 48.

a circuit element 49 is responsive to predetermined combinations of signal levels on lines 42, 46, 48 to provide a signal to an igniter 50 of the engine 30, so that the engine 30 is relit in the event of an unintentional flame-out.

Figure 3:
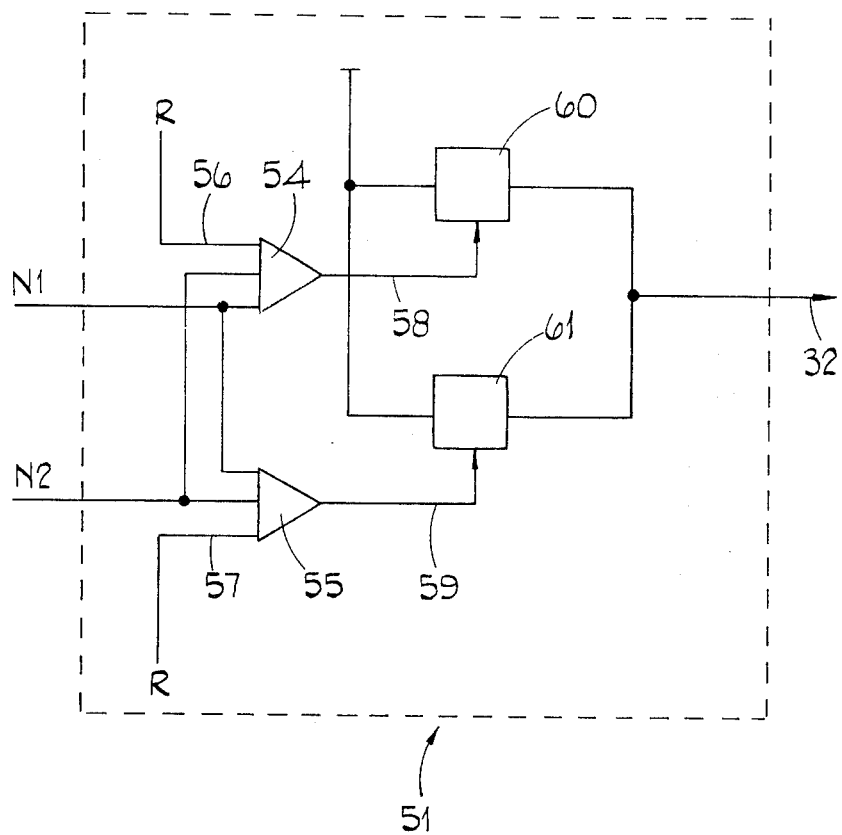
FIG. 3 shows a detail of the arrangement of FIG. 2.

A switching circuit 51, shown in detail in FIG. 3 is responsive to signal $N_1$ or signal $N_2$, via whichever of the respective control circuits 36, 37 is in operation. Circuit 51 is operable, when either signal $N_1$ or signal $N_2$ reaches 30% of its maximum value, to provide a signal on a line 52 to a starter arrangement 53 for the engine 30. The signal on line 52 is such as to inhibit operation of the starter arrangement 53.

Circuit 51 has a pair of comparators 54, 55 each of which can receive signal $N_1$ or $N_2$ as an input. Comparators 54, 55 are also responsive to reference signals R on respective lines 56, 57, so as to provide output signals on lines 58, 59 respectively when signal $N_1$ or $N_2$ exceeds 30% of its maximum value. The signals on lines 58, 59 act to control a pair of parallel switches 60, 61. Failure of one of comparators 54, 55 to provide an output signal, and/or failure of one of the switches 60, 61 in an open-circuit condition, does not affect the operation of circuit 51.

A fourth control circuit 62 is responsive to engine operating parameters and to selection of reheat to control the operation of the engine reheat system 31.

I claim:

1. An electric control circuit arrangement for a gas turbine engine, comprising a first control circuit responsive to a plurality of first input signals to provide first output control signals, a second control circuit responsive to a plurality of second input signals to provide second output control signals which are nominally identical with said first output control signals, corresponding ones of said first and second input signals being nominally indentical, a third control circuit responsive to at least one of said input signals to provide a third output control signal, and selector means for rendering either said first or said second control circuit operative, said selector means being responsive to malfunction of either one of said first and second control circuits to render the malfunctioning one of said circuits inoperative and to render the other of said circuits operative.

2. An arrangement as claimed in claim 1 in which said third control circuit is responsive both to one of said first input signals and to a corresponding one of said second input signals.

3. An arrangement as claimed in claim 1 in which said one input signal is applied to said third control circuit via the one of said first or second control circuits which is, for the time being operative.

4. An electric control circuit arrangement for a gas turbine engine, comprising a first control circuit responsive to a plurality of first input signals to provide first output control signals, a second control circuit responsive to a plurality of second input signals to provide second output control signals which are nominally identical with said first output control signals, corresponding ones of said first and second input signals being nominally identical, a third control circuit responsive to at least one of said input signals to provide a third output control signal and also being responsive to a plurality of nominally identical third input signals to provide a fourth output control signal, said first and second control circuits also being responsive to said fourth output signal, and selector means for rendering either said first or said second control circuit operative, said selector means being responsive to malfunction of either one of said first and second control circuits to render the malfunctioning one of said circuits inoperative and to render the other of said circuits operative.

5. An arrangement as claimed in claim 4 in which said first and second circuits include means for generating respective fifth and sixth output signals which are respective functions of selected ones of said first and second input signals and in which said third control circuit includes means, responsive to said one input signal, to said fourth output signal and to a selected one of said fifth or sixth output signals, for generating a seventh output signal.

6. An arrangement as claimed in claim 4 which includes a fourth control circuit for generating a control signal for a reheat system of said engine.

* * * * *